Jan. 8, 1952    M. W. OLSON    2,581,769
EXTRUSION DIE
Filed Feb. 1, 1949    2 SHEETS—SHEET 1
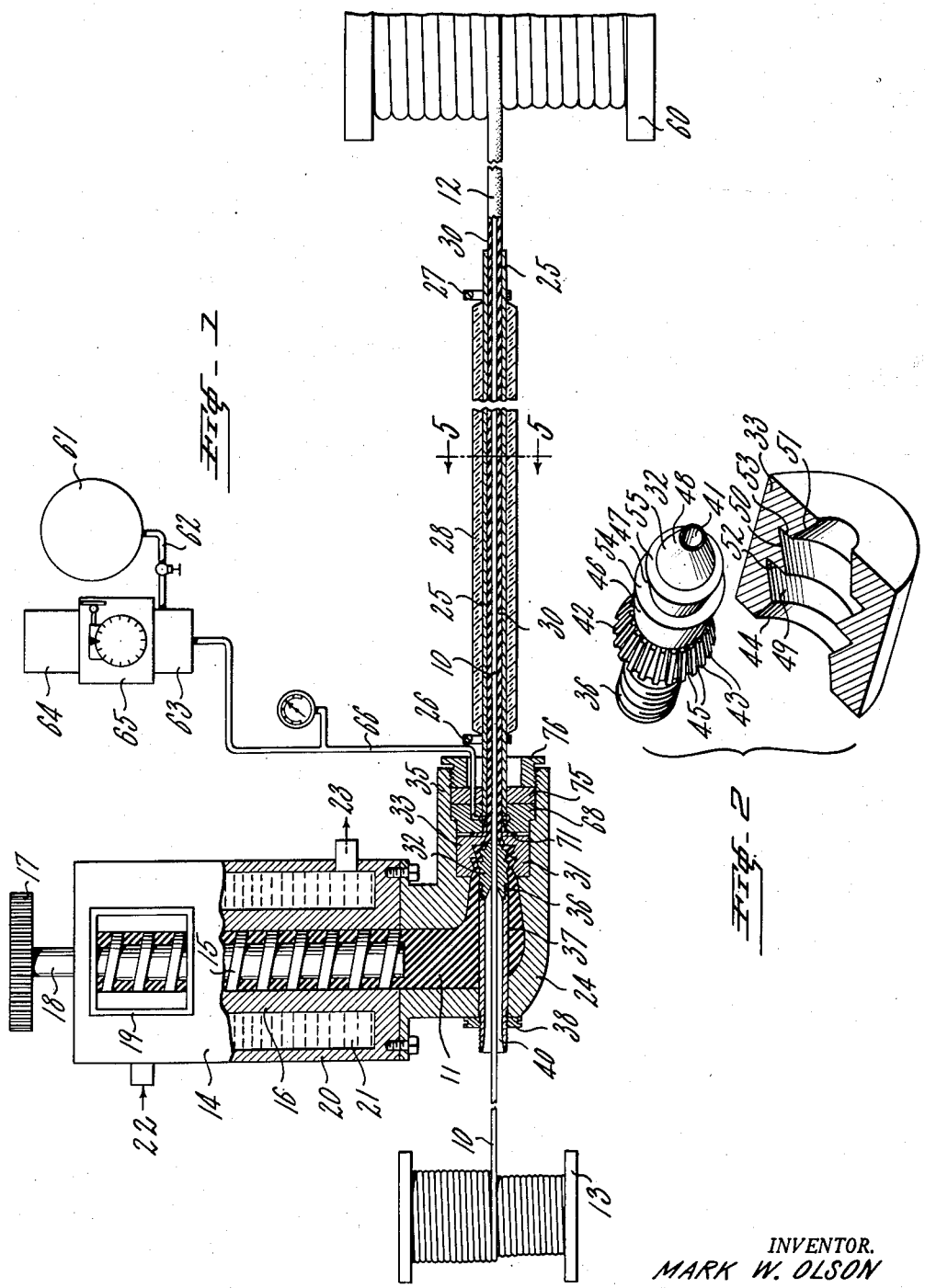
INVENTOR.
MARK W. OLSON
BY
Henry P. Truesdell
ATTORNEY Jan. 8, 1952     M. W. OLSON     2,581,769
EXTRUSION DIE
Filed Feb. 1, 1949     2 SHEETS—SHEET 2
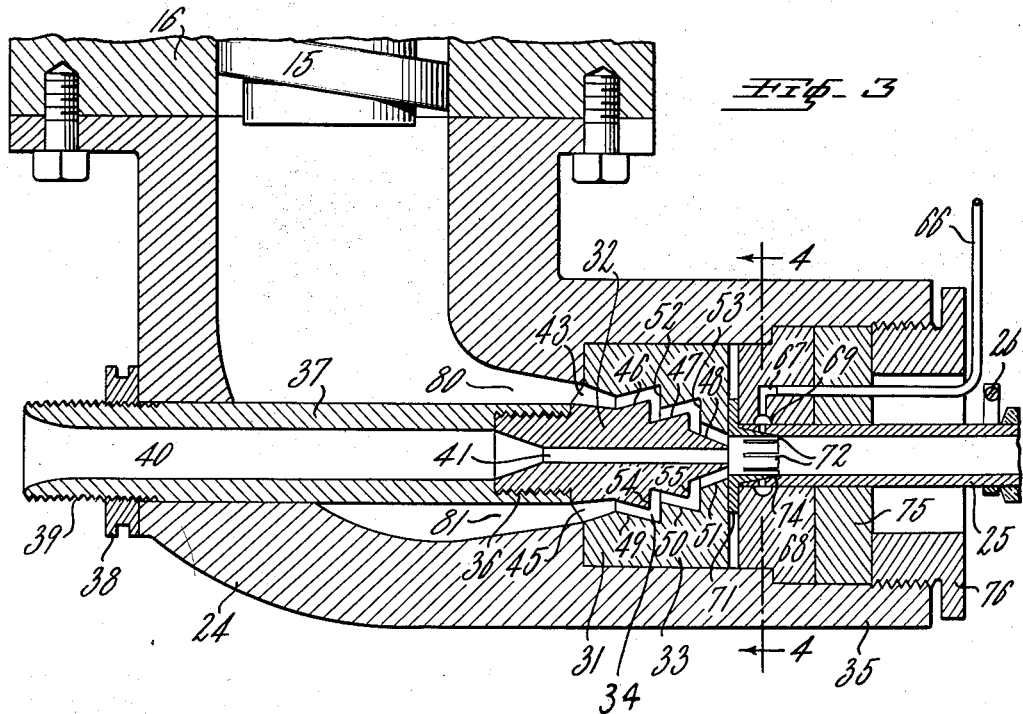
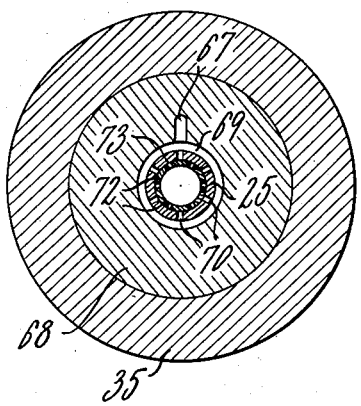
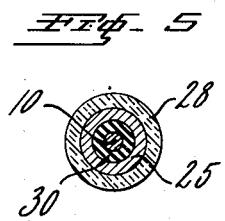
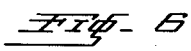
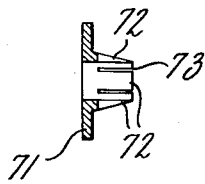
INVENTOR.
MARK W. OLSON
BY Henry P. Truesdell
ATTORNEY Patented Jan. 8, 1952

2,581,769

UNITED STATES PATENT OFFICE 2,581,769

EXTRUSION DIE

Mark W. Olson, Allendale, N. J., assignor to United States Rubber Company, New York, N. Y., a corporation of New Jersey Application February 1, 1949, Serial No. 73,995

5 Claims. (Cl. 18—13)

This invention relates to an extrusion die for rubber and the like and more particularly to an extrusion die so constructed and arranged as to raise the temperature of the stock as it passes therethrough.

One object of the present invention is to provide an extrusion die in which the stock being extruded is subjected to intense mechanical working so that it becomes heated while passing therethrough.

Another object of the invention is the provision of a means for increasing the temperature uniformly throughout a stream of rubber being extruded, without scorching the rubber.

Still another object is to provide a die for use in manufacture of rubber covered cables, or the like, wherein the cable is accurately centered with respect to the rubber covering by reason of the fact that radial pressures in the rubber become substantially equalized as the rubber passes through the die, and there is therefore no tendency for the rubber to urge the cable off center as the rubber is extruded thereon.

A further object is the provision of apparatus for manufacture of rubber jacketed articles by depositing a vulcanizable rubber stock on the article and vulcanizing the deposited stock by passing through a heated confining passageway, wherein the development of excessive pressures within the said heated passageway by thermal expansion of the deposited stock therein is prevented by pre-heating the vulcanizable stock before it enters the said heated passageway.

Further objects will be evident from the following detailed description of the invention, when read with reference to the accompanying drawings, wherein Fig. 1 is a plan view, partly in section, of a lubricated extrusion and vulcanizing apparatus, including a material heating die assembly constructed according to the present invention;

Fig. 2 is an exploded perspective view of a die assembly constructed in accordance with the invention;

Fig. 3 is an enlarged sectional view showing the die assembly of Fig. 1 and associated parts in more detail;

Fig. 4 is a transverse sectional view of the apparatus taken along the line 4—4 of Fig. 3;

Fig. 5 is a transverse sectional view of the apparatus taken along the line 5—5 of Fig. 1; and Fig. 6 is a detail of part of a lubricant applying means removed from the apparatus of Fig. 1.

The apparatus of the invention includes an extruder for depositing a rubber jacket on a wire to form an insulated electrical conductor which is vulcanized under pressure while passing through an elongated, heated, confining chamber. As will be explained in detail below, passage of the rubber covered wire through the elongated confining chamber without sticking or tearing is made possible by providing suitable means for lubricating the surface of the rubber jacket as it passes into the confining chamber. In order to prevent development of excessive pressures within the confining chamber by thermal expansion of the rubber jacket therein, which excessive pressures would make it difficult to prevent the rubber jacketed wire from sticking to the walls of the confining chamber, with resulting damage to the jacket or jamming of the apparatus, there is provided at the entrance to the confining chamber an irregular die assembly in which the rubber being deposited on the wire becomes heated by mechanical working as it enters the confining chamber. As a result of the increase in temperature of the stock being extruded, the subsequent thermal expansion which occurs within the heated confining chamber itself is minimized, and development of excessive pressure in the confining chamber is thus prevented.

This pre-heating of the rubber stock before it enters the confining chamber is accomplished without danger of pre-vulcanizing or scorching the vulcanizable stock, because the stock is heated uniformly throughout its entire mass by mechanical working in the irregular die. The stock is not subjected to excessive surface temperatures such as would be the case if it were attempted to pre-heat the stock by means of conventional heating jackets and the like, wherein it would be necessary to produce relatively high temperatures at the surface of the passing rubber stock in order to produce a given temperature rise in the interior of the stock.

Referring to Fig. 1 of the drawings, an extrusion apparatus is shown for covering a wire 10 with a vulcanizable rubber stock 11 to form a vulcanized rubber covered electrical conductor 12. The wire 10 to be covered with rubber stock 11 is fed from a suitable supply reel 13. The vulcanizable rubber stock 11 is deposited on wire 10 by means of a cross-head extruder 14 having a feeding screw 15 for the stock. The feeding screw is rotated within a barrel 16 by suitable means (not shown) through a driving gear 17 on the end of the shaft 18 of the screw 15. A suitable hopper 19 is provided at the entrance end of the extruder 14 for introducing the rubber into the extruder barrel 16.

In order to maintain the stock being extruded at the proper working temperature, a heating jacket 20 is provided around the extruder barrel 16. Hot oil 21, or a similar heating medium, may be circulated around the extruder barrel 16 through an inlet 22 and an outlet 23 in the walls of the jacket 20.

It should be noted that the temperature to which the vulcanizable rubber stock 11 can be heated by the heating oil 21, or by equivalent heating means, is limited by the fact that the stock 11 begins to vulcanize when a sufficiently elevated temperature is reached, depending on the formulation of the particular rubber compound being extruded. Such pre-vulcanization of portions of the stock 11 before it is deposited on the wire 10 results in defective articles, by reason of the fact that such pre-vulcanized or scorched portions are too hard to extrude properly.

For depositing the rubber stock 11 on the wire 10, the extruder 14 is fitted at its delivery end with a suitable cross-head assembly 24. The wire 10 to be jacketed with rubber passes through this cross-head assembly and into an elongated confining tube or die extension tube 25. The tube 25 is heated to vulcanizing temperatures by virtue of its own electrical resistance to current introduced at terminals 26 and 27 at each end of the tube. The confining tube 25 is covered with suitable heat insulation 28.

For the purpose of shaping the rubber stock 11 in the form of a rubber jacket 30 of the desired thickness as it is deposited on the wire core 10, a die assembly 31 is provided at the entrance of the confining tube 25. The die assembly 31, as shown in Figs. 1, 2 and 3 comprises a stepped tapered core or guide piece 32 and a cooperating outer member 33 which is annular and correspondingly stepped so as to define a tortuous annular passageway 34 (Fig. 3) for mechanically working and thereby heating the stock to be deposited on the wire. The die assembly 31 fits into a recessed portion of the delivery end 35 of the cross-head assembly 24.

The die cord or guide piece 32 is attached by means of a thread 36 to a guide extension member 37 which extends through the wall of the cross-head 24. The die core 32 may be accurately positioned by adjusting a threaded retaining collar 38 on the threaded end portion 39 of the guide extension member 37. The guide extension member 37 has a central longitudinal passageway 40 for passage of the wire 10 to be coated. The passageway 40 in the guide extension member 37 leads into a passageway 41 in the die guide 32. The wire 10 is coated with a deposited rubber jacket 30 of the desired thickness on emerging from the passageway 41.

In order to maintain the die guide piece 32 in concentric alignment with the outer die member 33 and with the die extension tube 25, the guide piece 32 is fitted with a slotted centering shoulder 42 having a number of radially extending spaced lugs 43 which engage the tapered entrance portion 44 of the outer die member 33. The rubber stock 11 passes into the die through the slots 45 between lugs 43.

In order that the rubber stock may be heated by mechanical working before it is deposited on the wire 10 as it passes into the elongated curing tube 25, the die assembly 31, as mentioned previously, is so constructed that the passageway 34 therein for the rubber stock is extremely irregular or tortuous. To this end, the central guide piece 32 of the die assembly 31 has three sharply offset or stepped surfaces 46, 47 and 48, corresponding to three similar offset or stepped surfaces 49, 50, and 51 on the annular outer member 33 of the die assembly. These surfaces defined sharply offset annular passageways of decreasing diameter. Disposed generally transversely of the aforesaid surfaces, there are provided abrupt faces 52 and 53 on the outer die member 33, which faces are disposed across the path of flow of the rubber stock. These faces, together with cooperating transverse faces 54 and 55 on the guide member 32, define passageways for the rubber which are disposed at a sharp angle with respect to the passageways defined by the inner die surfaces 46, 47, and 48, and the outer die surfaces, 49, 50 and 51. A material of such high viscosity as rubber is subjected to intense mechanical working and thereby becomes heated by being forced to flow through such an irregular path.

Fig. 5 shows a transverse sectional view of the wire 10 and the deposited rubber jacket 30 passing through the heated confining tube or die extension tube 25. The rubber jacket 30 fills out the die extension tube 25 entirely and conforms closely to the walls thereof. The tube 25 confines the rubber in the desired shape while it is being vulcanized. The vulcanized rubber covered wire 12, after emerging from the tube 25, is wound up at a suitable speed on a reel 60 which may be driven by conventional take-up means (not shown).

The movement of the rubber jacket 30 through the elongated confining tube 25 without sticking or tearing is made possible by the application of a thin film of lubricant to the surface of the passing rubber as it emerges from the die passageway 34 and passes into the curing tube 25. As shown in Fig. 1, lubricant, for example, silicone mold release fluid, to be applied to the surface of the passing rubber, may be contained in a suitable reservoir 61, from which it is fed through a line 62 to a positive delivery type pump 63, driven by a motor 64 equipped with a conventional variable speed transmission 65. The lubricant passes under pressure through a delivery line 66 into a supply passageway 67 (Fig. 3) in a collar 68 to which the curing tube 25 is attached. The collar 68 is also provided with an annular distributing passageway 69 from which the lubricant flows into a series of radial holes 70 in the walls of the tube 25 (Figs. 3 and 4).

For the purpose of spreading the lubricant evenly over the surface of the passing rubber and for the purpose of preventing any of the rubber stock from entering into and clogging the lubricant supply lines in the event that the pressure of the rubber stock exceeds the pressure of the lubricant, there is provided a lubricating ring assembly 71, which is shown in Fig. 6 removed from the apparatus. This lubricating ring 71 is provided with a number of longitudinally extending tapered blades or flaps 72 separated by slots or cuts 73. The lubricating ring 71 abuts the delivery end of the die assembly 31, and the tapered flaps 72 engage the correspondingly tapered entrance end 74 (Fig. 3) of the tube 25, each flap 73 covering one of the radial lubricant delivery holes 70. The die assembly 31, the lubricating ring 71, and the tube collar 68, are maintained in position within the recessed portion of the extruder head 35 by a retaining ring 75 and a threaded bushing 76.

The flaps or blades 72 of the lubricating ring 71 are thin enough to flex slightly away from the radial inlet holes 70 to permit a small amount of lubricant to be spread evenly over the surface of the passing rubber jacket 30 when the pressure of the lubricant in the holes 70 exceeds the pressure of the rubber stock. On the other hand, if the pressure of the rubber momentarily exceeds the pressure in the lubricant passages, the rubber presses the blades against the lubricant holes 70, closing them off and preventing any rubber from entering into and blocking the lubricant passages. As soon as the blades flex against the lubricant opening the positive pump 63 immediately builds up the pressure in the lubricating lines until the pressure of the lubricant exceeds the pressure of the rubber, whereupon lubrication of the rubber is resumed. Lubricated extrusion apparatus of this character is described in more detail and claimed in a copending application of the present inventor and Clifford A. Ferguson, Serial No. 61,654, filed November 23, 1948, and assigned to the same assignee as the present application.

Considering now the operation of the invention, the method of starting the apparatus will be described. The wire 10 to be jacketed with rubber is passed from the reel 13 through the passageway 40 in the guide extension member 37 and thence through the passageway 41 in the guide member 32 of the irregular die assembly 31 into the curing tube, and is wound up on the reel 60 which is so constructed and driven as to take up the product at a constant rate. The vulcanizable rubber stock 11 is passed from the extruder barrel 16 by the feeding screw 15 through the crosshead assembly 24, through the irregular passageway 34 of the die assembly 31, and is deposited on the wire 10 as the wire emerges from the guide passageway 41. The variable speed transmission 65 is adjusted so that the pump 63 delivers a slight excess of lubricant from the reservoir 61, through the lubricant delivery passages, and onto the surface of the advancing rubber jacket 30.

As the rubber jacket 30 advances along the curing tube or die extension tube 25, the rubber becomes heated to vulcanizing temperatures. As the temperature of the rubber increases, the rubber expands within the tube 25. The expansion of the rubber in a longitudinal direction is limited by the fact that the rubber jacket 30 is deposited on and adheres to the wire 10. Hence the expansion of the rubber occurs in a radial direction against the walls of the tube 25. This results in development of the desired vulcanizing pressures so that the vulcanized rubber covered wire 12 is a dense, vulcanized, uniform product of good physical and electrical properties, free from internal voids, and having a smooth shiny surface by reason of having been vulcanized within the lubricated tube 25. Because of the radial expansion of the rubber jacket 30 as it advances through the tube 25, the lubricating film on the surface thereof becomes gradually thinner as it travels through the tube. Under steady operating conditions, the flow of lubricant into the apparatus is only sufficient to maintain this thin film of lubricant unbroken so as to broken the rubber jacket 30 from contacting and adhering to the tube 25 at any point.

The amount of thermal expansion of the rubber jacket 30 which occurs within the die extension tube 25 is very small because the rubber stock 11 has been substantially pre-heated by the mechanical working to which it was subjected in passing through the irregular die assembly 31. If the rubber stock were not so pre-heated it would be found that the increase in size of the jacket 30 on passing through the tube 25 would be so great in certain cases as to cause the jacket 30 to exert excessive radial pressures. Such excessive radial pressures would displace the lubricating film between the surface of the jacket 30 and the walls of the tube 25, causing the rubber to stick and jam within the tube 25, with the result that the apparatus could not be operated.

Under usual operating conditions, with conventional rubber compounds, it has been found that the irregular die assembly 31 raises the temperature of the rubber stock by, for example, 20° to 50° F. or more, in comparison with the temperature of a similar stock passed through a conventional smooth die under the same conditions.

As indicated previously, the desired pre-heating effect on the rubber could not be obtained by heating the extruder barrel or cross-head by means of heating jackets, or electrical heating elements, etc. The reason for this is that such conventional heating means heat the rubber mass from the outside surface thereof. In order to develop a given temperature in the interior of the advancing rubber mass, a relatively higher temperature must be applied to the surface of the mass. If it is desired to heat the advancing rubber mass to temperatures approaching vulcanizing temperatures there is considerable danger of scorching the surface of the rubber in contact with the heated extruder body.

It should be noted that in using the irregular die assembly 31, the rubber is heated by mechanical working immediately prior to being extruded in the desired shape, so that there is no opportunity for the heated rubber to scorch or prevulcanize before being shaped. The entire mass of rubber thus being heated is advanced rapidly through the irregular passageway 34. There are no "dead" spots within the passageway 34 wherein portions of the heated rubber might remain and become scorched as the main portion of the rubber stream passes therethrough.

Another advantage of the irregular die assembly 31, is that the irregular die aids considerably in maintaining the wire 10 correctly centered as the rubber jacket 30 is deposited thereon. Thus, in a conventional cross-head extruder it is commonly observed that the pressure of the rubber within the tapered throat of the cross-head is not uniform, that is, the pressure of the stock in the area 80 (Fig. 3) of the inside curve of the throat is greater than the pressure in the area 81 of the outside curve of the throat. Such unequal pressures tend to urge the wire or other core off center as the rubber is deposited thereon. However, with the irregular die assembly 31, it is found that unequal pressures referred to become ironed out as the stock traverses the tortuous passageway 34, with the result that the wire 10 can be easily maintained in good concentricity with the extruded rubber jacket 30.

While the irregular heating die of this invention has been described in detail in conjunction with a lubricated extrusion and vulcanizing apparatus for manufacturing rubber insulated electrical wires, it will be understood that the invention is particularly well adapted to any manufacturing process wherein a rubber-like jacket is extruded onto a core and is subsequently passed through a heated confining and vulcanizing chamber. The irregular die effectively pre-heats the rubber, avoiding development of excessive pressure by thermal expansion within the said chamber.

The irregular die is also useful in other extrusion operations wherein it is desired to heat the stock as it is extruded, or wherein a proper centering of a core is desired with respect to a deposited outer jacket.

Having thus described my invention, what I claim and desire to protect by Letters Patent is:

1. In an extruding apparatus, a die for subjecting stock being extruded to mechanical working to increase the temperature of said stock, said die having a core member provided with a plurality of sharply stepped sections of decreasing diameter in the direction of flow of the stock and a cooperating outer member having correspondingly stepped sections and defining with said core a tortuous passageway in which the stock passing through the die is repeatedly forced to make sudden changes in direction of flow.

2. In an extruding apparatus, a die for subjecting stock being extruded to mechanical working to increase the temperature of said stock, said die having a generally tapered core piece provided with abruptly stepped surfaces, a correspondingly stepped cooperating outer member defining with said core a passageway for the stock, said outer member having abrupt faces disposed transversely to the axis of the core and intersecting the flow path of the stock through said passage, whereby the stock is repeatedly forced to change its direction of flow.

3. In an apparatus for extruding a covering on wire and the like, a die for subjecting the stock forming said covering to mechanical working while it is being extruded to increase the temperature of said stock, said die having a generally tapered core piece provided with a central passageway for the wire to be covered with stock, said core having axially offset outer surfaces, a cooperating outer member provided with corresponding offset surfaces and having abrupt faces disposed transversely of the axis of the core, a slotted shoulder to maintain said core and outer member in coaxial spaced relation, said core and outer member defining an irregular annular passage for the stock.

4. A die for use in apparatus for extruding a covering stock on wire and the like, said die comprising a generally tapered guide piece provided with a central passageway for the wire to be covered with stock, a cooperating outer member within which said guide fits, said guide and outer member defining a tapered annular passageway for the stock to be deposited on the wire, the surfaces of said guide piece and outer member being abruptly offset across the path of flow of the stock at intervals, so that the stock is forced to make abrupt changes in direction while passing through the die.

5. In an appartus for manufacturing vulcanized rubber covered cables and the like in which a vulcanizable rubber stock is forced through a die and deposited on the cable to be covered and in which the covered cable is passed from said die through an elongated lubricated die extension tube wherein the rubber covered cable is confined and compacted while being vulcanized, the improvement of a die having a generally tapered guide piece provided with a central passageway for the cable to be covered with stock, a cooperating outer die member within which said guide fits, said guide and outer die member defining an annular passageway for the stock to be deposited on the wire, the surfaces of said guide piece and outer die member being abruptly offset across the path of flow of the stock at intervals, so that the stock is forced to make abrupt changes in direction, thereby becoming heated by mechanical working while passing through the die.

MARK W. OLSON.

REFERENCES CITED

The following references are of record in the file of this patent:

UNITED STATES PATENTS

| Number | Name | Date |
| --- | --- | --- |
| 466,910 | Royle et al. | Jan. 12, 1892 |
| 1,726,359 | Martell et al. | Aug. 27, 1929 |
| 2,349,178 | Kopitke | May 16, 1944 |
| 2,358,354 | Stacy et al. | Sept. 19, 1944 |
| 2,401,551 | Cook, Jr. | June 4, 1946 |